US012579248B2

(12) United States Patent
Bealby

(10) Patent No.: US 12,579,248 B2
(45) Date of Patent: Mar. 17, 2026

(54) SYSTEMS, DEVICES, AND METHODS FOR TRACKING REMOTE EQUIPMENT LOCATION AND UTILIZATION OF COMPUTING DEVICES

(71) Applicant: Electro Rent Corporation, West Hills, CA (US)

(72) Inventor: Tim Bealby, Harrow (GB)

(73) Assignee: Electro Rent Corporation, West Hills, CA (US)

( * ) Notice: Subject to any disclaimer, the term of this patent is extended or adjusted under 35 U.S.C. 154(b) by 173 days.

(21) Appl. No.: 18/532,700

(22) Filed: Dec. 7, 2023

(65) Prior Publication Data

US 2024/0193254 A1     Jun. 13, 2024

Related U.S. Application Data

(60) Provisional application No. 63/431,266, filed on Dec. 8, 2022.

(51) Int. Cl.
*G06F 21/00* (2013.01)
*G06F 21/44* (2013.01)

(52) U.S. Cl.
CPC .................................. *G06F 21/44* (2013.01)

(58) Field of Classification Search
CPC ...................................................... G06F 21/44
See application file for complete search history.

(56) References Cited

U.S. PATENT DOCUMENTS

| | | | | |
|---|---|---|---|---|
| 9,900,742 | B1 * | 2/2018 | Thoresen | .............. H04W 4/021 |
| 2017/0366420 | A1 * | 12/2017 | Peacock | ................. H04L 43/04 |
| 2020/0219597 | A1 | 7/2020 | Robbins et al. | |
| 2020/0223358 | A1 * | 7/2020 | Cordova | ............... G06N 5/046 |
| 2022/0215093 | A1 | 7/2022 | McMaster et al. | |

* cited by examiner

*Primary Examiner* — Rodman Alexander Mahmoudi
(74) *Attorney, Agent, or Firm* — Command IP LLP; Pejman Yedidsion

(57) ABSTRACT

Methods, devices, and systems for tracking remote equipment utilization of, for example, mobile computing devices, by managing received location information data and device usage data at a remote computing device, where the managing includes determining whether to store the received location information data and device usage data and whether to delete previously received location information data and device usage data associated with monitored device.

18 Claims, 8 Drawing Sheets

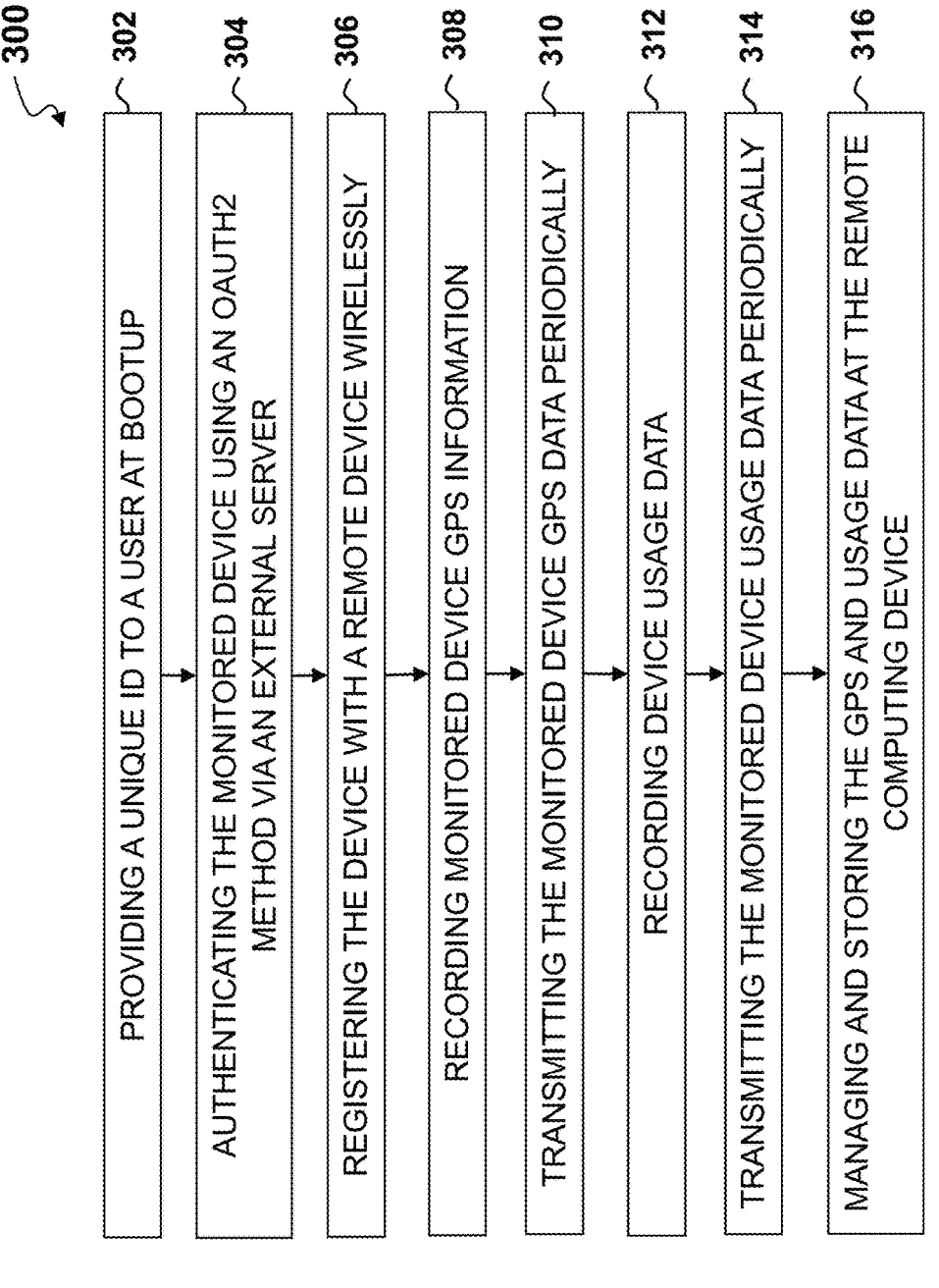

300

302 PROVIDING A UNIQUE ID TO A USER AT BOOTUP

304 AUTHENTICATING THE MONITORED DEVICE USING AN OAUTH2 METHOD VIA AN EXTERNAL SERVER

306 REGISTERING THE DEVICE WITH A REMOTE DEVICE WIRELESSLY

308 RECORDING MONITORED DEVICE GPS INFORMATION

310 TRANSMITTING THE MONITORED DEVICE GPS DATA PERIODICALLY

312 RECORDING DEVICE USAGE DATA

314 TRANSMITTING THE MONITORED DEVICE USAGE DATA PERIODICALLY

316 MANAGING AND STORING THE GPS AND USAGE DATA AT THE REMOTE COMPUTING DEVICE

FIG. 3

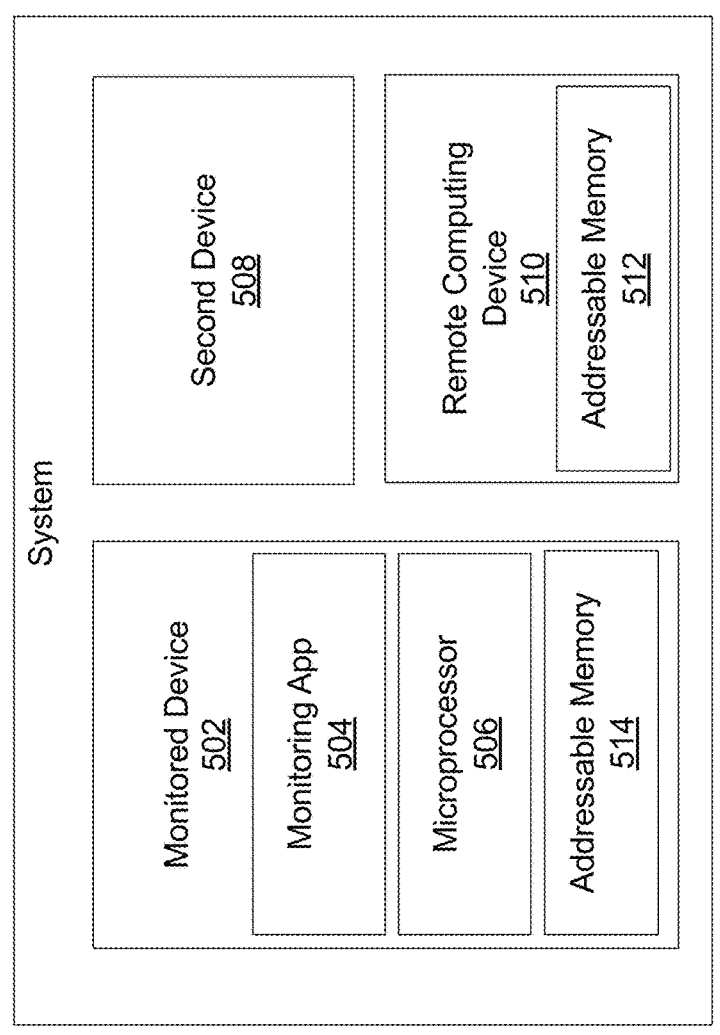
FIG. 5

SYSTEMS, DEVICES, AND METHODS FOR TRACKING REMOTE EQUIPMENT LOCATION AND UTILIZATION OF COMPUTING DEVICES

CROSS-REFERENCE TO RELATED APPLICATION

This application claims the priority benefit of U.S. Provisional Patent Application Ser. No. 63/431,266 filed Dec. 8, 2022, incorporated herein by reference in its entirety.

TECHNICAL FIELD

Embodiments relate generally to tracking device usage, and more particularly to tracking device usage in correlation to other devices.

BACKGROUND

Usage metrics are useful to measure many factors related to specific equipment such as: the wear endured by the equipment, amount of time running, errors related to performance, etc. These factors are paramount in determining the condition of equipment and making future decisions such as when to replace a device, repair the device, decommission the device, or even if theft of the device has occurred. When a device is rented, it may be delivered to a separate facility or signed out to specific people/operators. Unfortunately, simply signing for equipment does not provide the level of detail an equipment manager may need to ensure the equipment conditions are desirable. Thus, a method is needed to track, identify, and correlate a device's usage while providing data security.

SUMMARY

A method embodiment may include: providing, by a monitored device, a unique ID associated with the monitored device at bootup; associating, by a remote computing device, the monitored device with a unique ID based on receiving the unique ID from the monitored device; authenticating, at the remote computing device, the monitored device via an OAUTH2 server and using the unique ID; registering the monitored device with the remote computing device based on a successful authentication using the unique ID; recording location data associated with the registered monitored device locally at the monitored device; transmitting, by the monitored device, the location data to the remote computing device periodically; recording device usage data associated with the monitored device locally at the monitored device; transmitting, by the monitored device, the device usage data to the remote computing device periodically; and managing the location data and the device usage data at the remote computing device, where the managing may include determining whether to store the received location data and the received device usage data, and whether to delete previously received location data and previously received device usage data associated with the monitored device, thereby tracking location and usage data of the monitored device.

In one embodiment, the step of associating the monitored device with a unique ID may further include storing the unique ID with information related to the monitored device, including at least one of: an asset tag, an asset number, a MAC address, and a combination of the asset tag, the MAC address, a manufacture number, a manufacture name, and a model number. In another embodiment the remote computing device may be external to the monitored device. In another embodiment, the authentication using the unique ID, may include: transmitting the unique ID from the monitored device to the remote computing device; and determining, by the remote computing device, if the ID transmitted from the monitored device is found to be stored in the remote computing device.

In one embodiment, the location data and the usage data may be used to determine a status indicating when the monitored device has been switched off or is not being used. In another embodiment, each of the steps of transmitting the location data and transmitting the usage data may be performed according to a transmission schedule at set times including at least one of: at bootup of the monitored device, a predetermined transmission time interval, and a predetermined transmission time point. Additionally, the method may further include the step of transmitting a heartbeat of the monitored device at a time outside of the transmission schedule, where the heartbeat includes only usage data on a daily basis.

In one embodiment, each of the steps of transmitting the location data and transmitting the usage data may be triggered by an event that may include a significant change in the location data and a detection of the location data exiting outside a predetermined boundary. In addition, in the steps of transmitting the location data and transmitting the usage data, an actual time of transmitting the location data and an actual time of transmitting the usage data may be different if one of the location data and the usage data has not been recorded at the set time. Additionally, each of the steps of transmitting the location data and transmitting the usage data may include retrying transmission of data, where the retrying transmission includes retransmitting the data if it has been detected that a previously transmitted data was not received in the remote computing device. The retrying transmission may be limited to a predetermined number. Further, in each of the steps of transmitting the location data and transmitting the usage data, the transmission and retransmission of the location and usage data may be performed by a request from the remote computing device.

In one embodiment, the step of transmitting the usage data may include a time and date stamp, a battery level, a wireless data usage, an internal temperature of the monitored device, a signal strength, proximity of other devices, and measurements, and an uptime duration defined as a time period when the device was booted to a current time. In one embodiment, the step of managing may include executing, by at least one of the remote computing device and the monitored device, logic to determine whether to store every location data with every usage data based on at least one of comparison with previous data received to see if a change has occurred, a filter set by the user to only store certain data, and a threshold number of data points.

The method may include the step of managing that may include processing the location data and the usage data received by the remote computing device by applying machine learning to the received location and the usage data to leverage data to improve performance of the monitored device.

In one embodiment, the step of authenticating may be performed using an OAUTH2 method comprising: sending, by the monitored device, a communication request to the OAUTH2 server of the remote computing device; authenticating and granting the communication request, by the OAUTH2 server and returning a token to the monitored device, where the steps of transmitting the location and usage data includes the steps of: sending, by the monitored device, a second request with the token and the location and usage data to a web service portion of the remote computing device; and sending, by the web service portion, the location and usage data to a database service of the remote computing device, where the step of managing includes storing and processing the location and usage data.

In one embodiment, the method may further include operating, by a test device connected to the monitored device, the monitored device to utilize a wireless network in a location where the monitored device is located, where the steps of recording the location and usage data may be performed while the monitored device is operated utilizing the wireless network, so that the test device tests wireless networks in different locations by using the monitored device while monitoring and tracking the monitored device in the remote computing device.

In another embodiment, a system embodiment may include: a monitored device that includes a processor and addressable memory, and is in communication with a remote computing device, where the monitored device may be configured to: determine an ID associated with the monitored device at bootup of the monitored device; transmit the determined ID to the remote computing device for authentication; store collected location and usage data associated with the monitored device; and the remote computing device includes a processor and addressable memory, the remote computing device may be external to the monitored device, and the remote computing device may be configured to: receive the determined ID and associate the monitored device with the ID in the addressable memory; authenticate the monitored device via determining if the ID transmitted from the monitored device is found to be stored in the addressable memory; register the monitored device if the ID is successfully authenticated; transmit a token to the monitored device indicating that a server authentication was granted; where the monitored device may be further configured to transmit the stored location and usage data to the remote computing device periodically, where the transmission of the stored collected location and usage data is at least one of: at the same time and at different intervals; and where the remote computing device may be further configured to receive the location and usage data from the monitored device, and store and manage the received data based on a successful authentication, thereby tracking location and usage data of the monitored device at the remote computing device.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which:

FIG. 3 depicts a detailed flow chart of a method of tracking location and usage data of a monitored device, according to an embodiment of the disclosure;

FIG. 5 depicts a block diagram of a system for tracking location and usage data of a monitored device, according to an embodiment of the disclosure;

DETAILED DESCRIPTION

Figure 1:
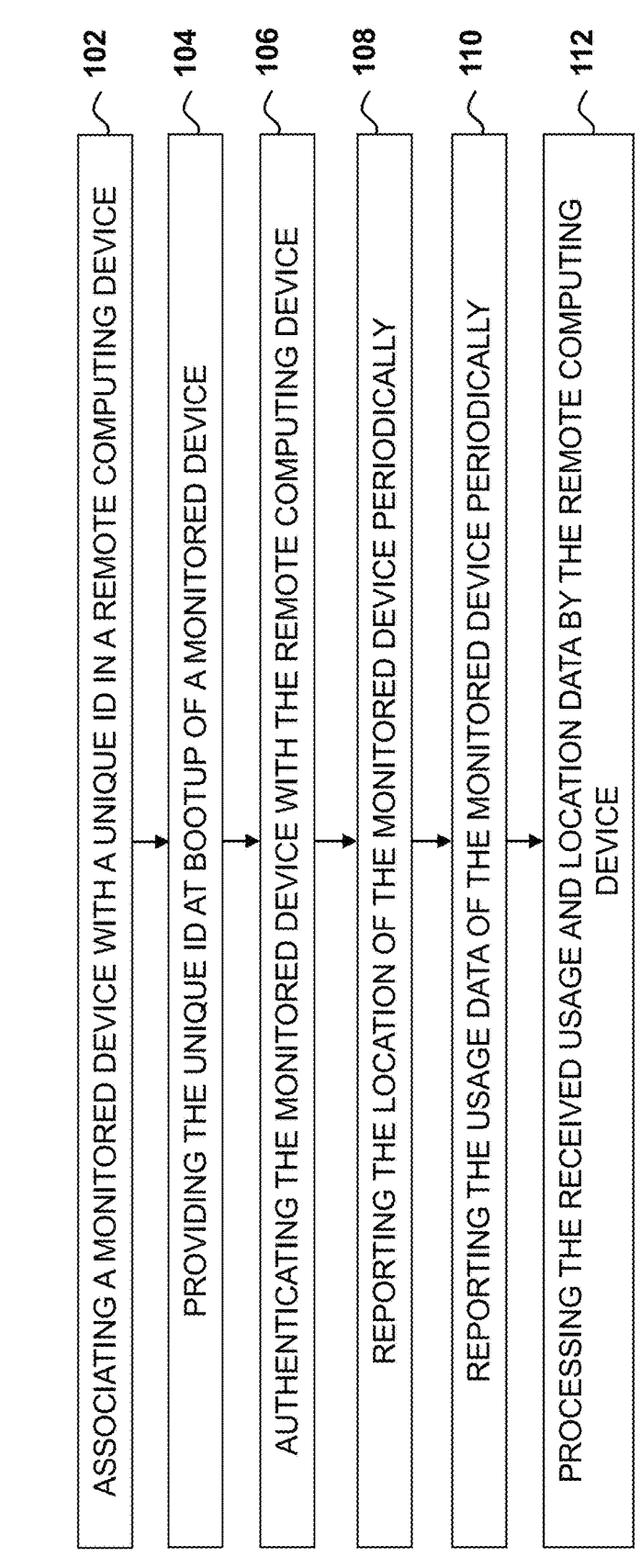
FIG. 1 depicts a flow chart of a method of tracking the location and usage data of a monitored device, according to an embodiment of the disclosure.

The disclosed embodiments depict systems, devices, and methods for tracking remote equipment location and utilization of, for example, mobile computing devices. The mobile computing device may include a processor and addressable memory, an interface implemented by a display screen, such as an LCD or OLED screen, a touchscreen interface, Global Positioning System (GPS) capabilities, and digital or physical buttons. Such devices connect to the Internet and connect with other devices via Wi-Fi, Bluetooth, cellular networks, and/or near field communication (NFC) and are configured to transmit/receive data.

According to one embodiment of the present disclosure, a method of tracking location and usage data of a monitored device may include: associating, at a remote computing device, the monitored device with a unique ID; providing, for example, through a monitoring application being executed on the monitored device, a unique ID associated with the monitored device to a user, at bootup of the monitoring device; authenticating, at a remote computing device external to the monitored device, the monitored device, for example, via an OAUTH2 method and at an OAUTH2 server; using the unique ID; registering the monitored device with the remote computing device if the unique ID is successfully authenticated; recording location data, for example, GPS information, associated with the monitored device locally at the monitored device; transmitting, by the monitored device, the location data to the remote computing device periodically; recording device usage data associated with the monitored device locally at the monitored device; transmitting, by the monitored device, the device usage data to the remote computing device periodically; and managing the location data and device usage data at the remote computing device, wherein the managing may include determining whether to store the received location data and device usage data and whether to delete previously received location data and device usage data associated with the monitored device.

According to one embodiment, a system of tracking location and usage data of a monitored device may include: the monitored device monitored by the remote computing device; a monitoring application executing on the monitored device and configured to provide an ID associated with the monitored device to a user of the monitored device, where the monitored device may be configured to transmit the ID to the remote computing device for authentication, record location and usage data of the monitored device, and transmit the data to the remote computing device periodically;

and the remote computing device which may be external to the monitored device, including an addressable memory, and may be configured to: serve the monitoring application, associating the monitored device with the ID in the addressable memory, authenticate the monitored device by determining if the ID transmitted from the monitored device is found to be stored in the addressable memory, register the monitored device if the ID is successfully authenticated, receive the location and usage data from the monitored device, and store and manage the received data.

FIG. 1 depicts a flow chart of a method 100 of tracking a device location and associated usage data, according to an embodiment of the disclosure. The method 100 may be initiated when a user of the monitored device may first install a monitoring application provided by a remote computing device. The monitoring application may be delivered via an app store to enable the user to easily install the app and allow a service provider of the remote computing device to provide updates of feature enhancements and/or security to the app automatically. After the installation of the monitoring app, the first step 102 may be performed through the monitoring application.

The first step 102 includes associating the monitored device with a unique ID in a remote computing device. In some embodiments, the association process may include storing the unique ID with an asset tag or number associated with the monitored device in the remote computing device. In other embodiments, the association process may include storing the unique ID with a MAC address associated with the monitored device. In other embodiments, the association process may include the remote computing device storing the unique ID with a combination of information describing the monitored device, including a MAC address, an asset tag, a manufacture number, a manufacture name, and a model number. A next step 104 may include providing the unique device ID to the monitored device at the initial startup of the monitoring application or at bootup of the monitored device. After the monitoring application or the monitored device has been started using a bootstrap procedure, the unique ID is presented to the user on the monitored device. In a next step 106, the monitored device may be wirelessly authenticated with the remote computing device where the unique ID of the monitored device is stored, against a record describing that monitored device in a database of the remote computing device. During the authentication process, the monitored device may provide a unique ID to the remote computing device, and the remote computing device may, using the provided unique ID, determine if the ID exists in an addressable memory where the unique ID was previously associated with the monitored device in step 102. If the unique ID provided to the remote computing device is found to be stored or previously associated in the remote computing device, the authentication process step 106 may be accepted and executed. In some embodiments, if the monitored device with the unique ID is successfully authenticated with the remote computing device, the remote computing device may register that monitored device in the database of the remote computing device. The registration may be performed on the monitored device itself while in other embodiments, the device ID may be used on a separate device to register the device.

In a next step 108, the monitored device may periodically transmit the device's location information to the remote computing device. In some embodiments, the location information may include GPS data. In other embodiments, the location information may include triangulated Internet of Things (IOT) data, while in other embodiments, the location information may be a combination of GPS data and triangulated IoT data. In other embodiments, the location information may be transmitted at set times throughout the day, for example, at a startup time of the monitoring app, a bootup time of the monitored device, and/or a specific point in time, such as at 10:00 am, and at 4:00 pm, while the monitored device is registered. In other embodiments, set times may include a predetermined transmission time interval such as, every two hours. In other embodiments, a location transmission may include a retry sequence, where the retry sequence may include retransmitting location information to the remote computing device and/or a cloud device if it has been detected that a previously transmitted location was not received. In one embodiment, the retry may be limited to a specific number.

In the next step 110, the monitored device may periodically transmit/report usage data, where the transmission/reporting may be during intervals that may be predetermined or alternatively dynamically determined. For example, the usage data may include a time/date stamp and battery level. In some embodiments, the usage data may also include wireless data usage. In one embodiment, the wireless network and wireless data may include cellular network and cellular data, respectively. In other embodiments, the usage data may include a device temperature or other related equipment information. In step 112, the remote computing device may process the received reported device usage and location data. In some embodiments, the processing step may include the application of machine learning to the received location and usage data. In such embodiments, the machine learning methods may be used to leverage data to improve performance on some set of tasks of the monitored device as specified in the disclosed embodiments.

Figure 2:
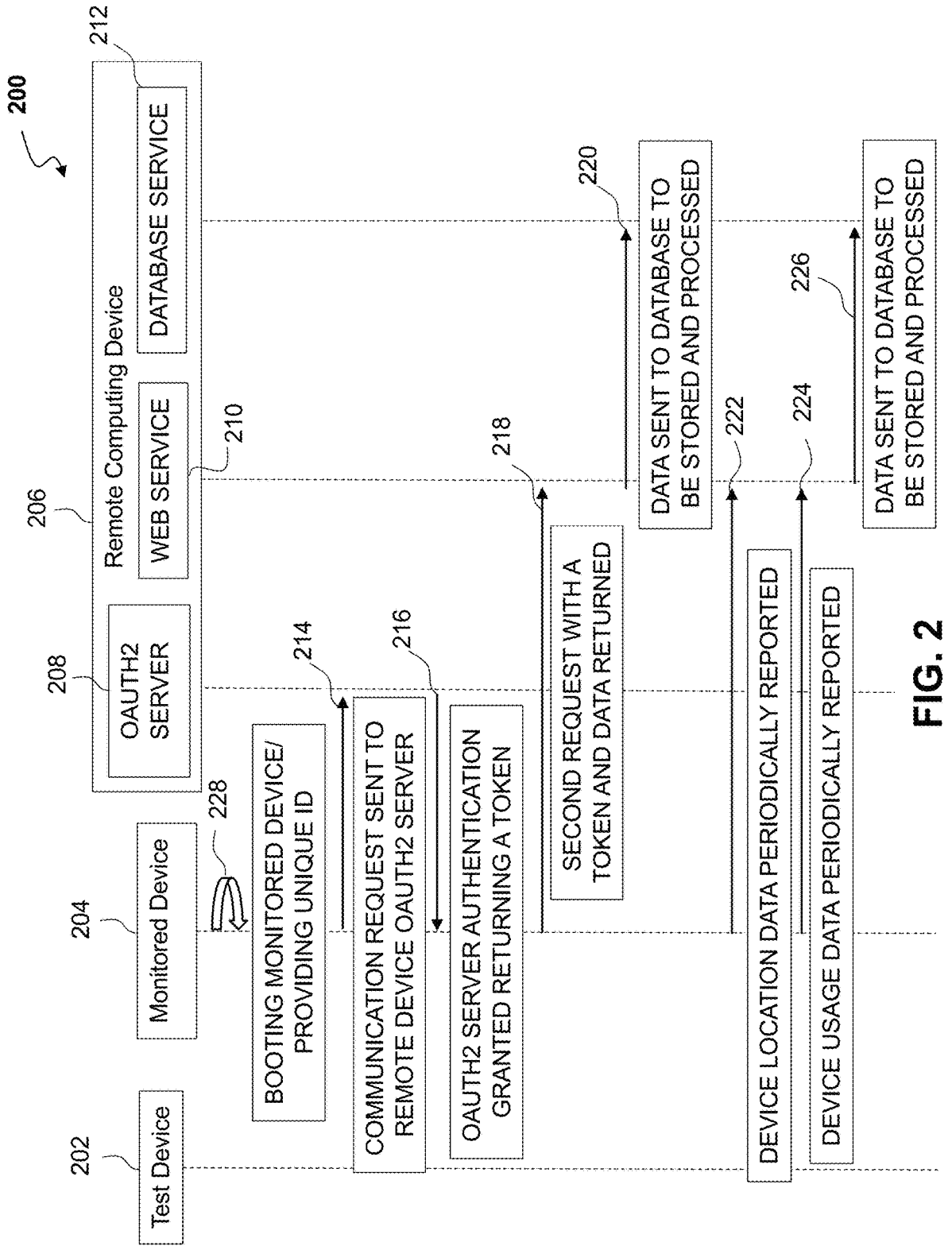
FIG. 2 depicts a data signal flow diagram of a system of tracking location and usage data of a monitored device, according to an embodiment of the disclosure.

FIG. 2 discloses a data signal flow diagram 200 of a device location and usage tracking system according to an embodiment. The device location and usage tracking system may include a monitored device 204, a remote computing device 206, and a test device, for example, second device 202. The data signal flow diagram 200 may further include an initial booting up of the monitored device 204 and providing of a unique ID 228. At an initial screen of the monitored device after the bootup process of the monitored device, in one embodiment, a unique ID is provided to a user, which may be used to register the monitored device in the remote computing device. In one embodiment, the unique ID of the monitored device may be automatically registered with the remote computing device. In another embodiment, if the remote computing device associates multiple monitored devices with the unique ID, this unique ID may be used on the multiple monitored devices, including a separate monitored device, associated with the unique ID to register or track the device. In some embodiments, the initial booting up of the monitored device 204 may be an initial startup of a monitoring application installed on the monitored device 204 as described above in FIG. 1.

Prior to, or in one embodiment during, the registration process, an authentication process may be executed between the monitored device 204 and the remote computing device 206. During this process, a communication request 214 may be transmitted to an OAUTH2 server 208 being executed on the remote computing device 206. In response, the OAUTH2 server 208 may authenticate and grant the communication request 214, returning a token 216 to the monitored device. Subsequently, a second request 218 with a token and device data may be returned 218 from the monitored device 204 and sent to a web service 210 being executed on the remote computing device 206. In some embodiments, this device data may include: a device unique ID, a MAC address, GPS location data, device battery level information, a time stamp, and optionally, data associated with a paired second device 202. The disclosed embodiments may include a second device 202 that may be a device paired with and connected to the monitored device 204 to test or measure the monitored device 204. In some embodiments, the second device may be a test device. Upon receipt of the second request 218 and data from the monitored device 204, the remote computing device 206 may transmit the received data to a database service 212, to store and process the data 220. In some embodiments, the remote computing device 206 may only receive data, while in other embodiments, the remote computing device 206 may transmit and receive data.

After an initial registration process, at periodic reporting intervals 224 and 222, the monitored device may transmit GPS and usage data to the web service 210 portion of the remote computing device 206. The GPS and usage data may be transmitted 226 to the database service 212, and then stored and processed therein.

In some embodiments, the monitored device 204 may retransmit location and usage data when requested by the remote computing device 206. In other embodiments, retransmission limits may be used to limit communication between the monitored device 204 and remote computing device 206.

In other embodiments, a multitude of monitored devices 204 may require registration where the monitored devices 204 may be paired with a single second device 202. In another embodiment, one or more second devices, for example, test device 202, may be paired with a multitude of monitoring or monitored devices 204. In this embodiment, GPS and usage data may be unique to each monitored device 204. In another embodiment, a multitude of monitored devices 204 may report all data to a single primary device which may relay and transmit the plurality of device data to the remote computing device 206.

FIG. 3 depicts a flow chart of a method 300 of tracking a device location and usage data, according to one embodiment of the present disclosure. Illustrated in the diagram 300 is a first step 302 of providing a unique ID to a user at bootup of a monitored device. In some embodiments, the unique ID may be a fixed ID associated with the monitored device.

After the first step 302, the monitored device may be authenticated with a remote computing device, such as an external server, in a second step 304. This authentication process may be performed using, for example, an OAUTH2 method. At a third step 306, if the monitored device is successfully authenticated, the monitored device is wirelessly registered with the remote computing device where in one embodiment a monitoring application (app) installed and being executed on the monitored device may incorporate a 2-step authentication process. In this embodiment, the unique ID and a password along with a request for a token may be transmitted from the monitored device to the remote computing device for authentication. Following receipt of the token, the app may send or transmit the token along with the unique ID for validation. Upon successful ID validation, the app may then send the token along with the location and/or usage data message to the remote computing device. In some embodiments, the unique ID of the monitored device is registered and paired with a second device and stored in a remote computing device.

At the next step 308, the monitored device may record and store a set of GPS location information, where the GPS location information may include a time stamp in correlation with the monitored device. This data may then be periodically transmitted to the remote computing device at a previous step 310, where a periodic transmission may include an initial GPS location data at registration. In some embodiments, the monitored device may transmit a recorded set of GPS coordinates, date/timestamp, and battery level to the remote computing device upon an immediate device bootup or at startup of the monitoring app. In other embodiments, the monitored device may retry the transmission of this data at predetermined intervals, for example, up to 3 times over a time period of 10 minutes. In other embodiments, an attempt to retransmit may subsequently occur every 2 hours with a 3 retry limit over another 10 minutes.

In some embodiments, the subsequent step 310 may include scheduled times throughout a day while in other embodiments a scheduled transmission of GPS data may be in response to a transmission request from a remote computing device. In other embodiments, a periodic GPS data transmission may be triggered by a certain event where the event may include a significant change in GPS location data. In other embodiments, an event may include a detection of the GPS location data exiting outside a GPS boundary, where a GPS boundary may be a region where a monitored device is expected to stay within. In this example, the remote computing device may predetermine the region that the monitored device needs to stay within.

In the following step 312, the monitored device may record device usage data, where a usage data may include: a time/date stamp, and a monitored device battery level, signal strength, proximity of other devices, or other related device statuses or measurements. In some embodiments, the device usage data may further include a monitored device internal temperature. In other embodiments the monitored usage data may include an uptime duration, where the time duration may describe a time period when the device was booted to a current time.

In the next step 314, the monitored device may periodically transmit a monitored device usage data to the remote computing device. In some embodiments, the monitored usage data may be transmitted at the same time as a GPS data is sent. In other embodiments, the monitored device may transmit at additional times, for example, transmissions may occur every hour. In other embodiments, the monitored device may transmit the usage data without the collection and transmission of GPS data. For example, if a GPS signal cannot be acquired at a time when a data transmission is scheduled, the monitored device may transmit limited data including only collected usage data. In another embodiment, if the GPS data is not available, the monitored device may transmit the previously collected set of data. In other words, an actual time of transmitting the location data and an actual time of transmitting the usage data may be different if one of the location data and the usage data has not been recorded at the set time.

In some embodiments, the monitored device may transmit a location, battery level, and date/time. In one embodiment, the utilization may be implied by the receipt of these messages at the remote computing device. In another embodiment, the remote computing device and/or the monitored device, or both, may execute logic to determine whether to store every location with every utilization record. The determination of whether to store every location may be based on a number of factors, for example, comparison with previous data received to see if a change has occurred, a filter set by the user to only store certain data, number of data points received previously from that monitored device (to meet a threshold number), and the importance of that monitored device as may have been indicated by the user.

In the next step 316, the remote computing device may manage and store the GPS and usage data. The management and storage may include analysis of the GPS and usage data. In some embodiments, the management may include applying machine learning as a tool to analyze the data. In other embodiments, management may include removal and/or deletion of GPS location data due to corporate or regional data handling directives, for example. The management may include deletion of data older than a specified period of time, for example, any stored data older than 6 months may be deleted automatically. In other embodiments, a daily batch removal of data may be performed. In other embodiments, the GPS location data captured in older offline backups may not be deleted and may only be potentially accessible in an extreme disaster recovery scenario by a remote device database administrator. In other embodiments, the remote computing device may include user options to remotely define application settings, where the monitored device may receive app setting changes wirelessly from the remote computing device.

Figure 4:
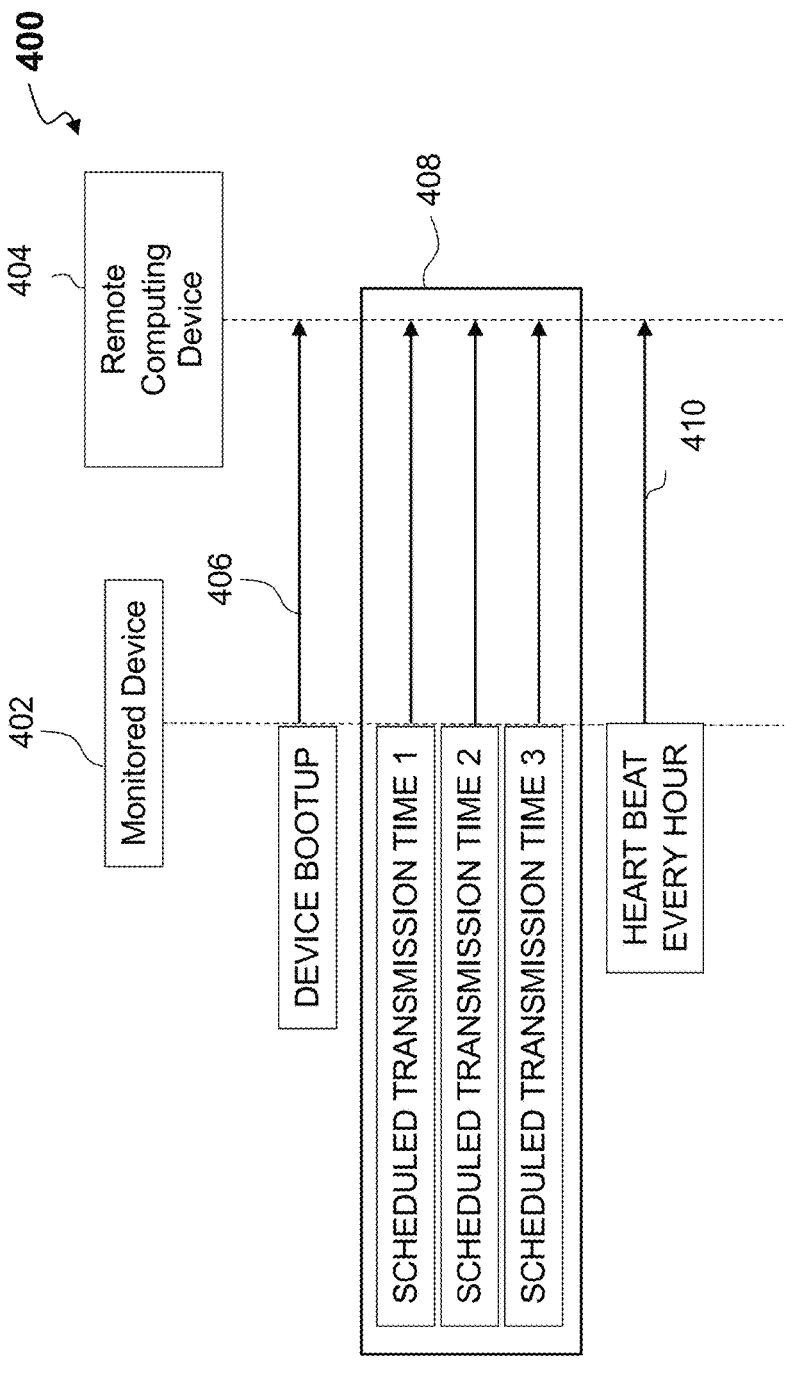
FIG. 4 depicts a data signal flow diagram of a system according to a data transmission schedule of a monitored device, according to an embodiment of the disclosure.

FIG. 4 depicts a data flow diagram of a monitored device reporting GPS and usage data according to a transmission schedule 400. Included in the schedule 400 is a monitored device 402 where a first transmission occurs at device bootup 406. In this embodiment, a preliminary detected GPS and stored usage data may be initially transmitted to a remote computing device 404. In some embodiments, the initial transmission data may use a default device ID to identify the monitored device 402.

In a second scheduled transmission period 408, the monitored device may apply a transmission schedule preset in the monitored device 402 settings. In one embodiment, the transmission schedule may be defined and/or programmed to have at least one transmission daily. The schedule as depicted may include, for example, three (3) daily scheduled transmissions of the GPS location data. In some embodiments, the second scheduled transmission period 408 may include more or less than the depicted example of three (3) daily scheduled transmissions. In other embodiments, the scheduled daily transmissions may also include usage data. In some embodiments, the monitored device transmission schedule may be set to dynamically transmit GPS and usage data, such as upon an active request by the remote computing device 404 that may have been initiated by a user. For example, the remote computing device 404 user may request GPS and usage data at a specific instant or enter a custom scheduled time or frequency.

At a third illustrated scheduled transmission 410, the monitored device may include a usage data package or "heartbeat" which is transmitted outside of the scheduled transmission period(s) 408. For example, a heartbeat may transmit only usage data. In other embodiments, the heartbeat may further include not only usage data, but also a battery level, a time stamp, and other such relevant information about the monitored device.

FIG. 5 depicts a system block diagram 500, according to an embodiment of the disclosure, where the system 500 includes a monitored device 502 that is monitored by the remote computing device. In some embodiments, the system 500 may include a plurality of monitored devices. In other embodiments, the monitored device may be a mobile phone while in other embodiments, the monitored device may be a tablet or other mobile device configured to collect GPS and usage data. Included in the monitored device 502 may be a microprocessor 506 configured to process and run a monitoring application (app) 504. Further included in the monitored device 502 may be the microprocessor 506 configured to run the monitoring app 504 as well as communicate with a second device 508 and a remote computing device 510 wirelessly. The monitoring app 504 may be installed on the monitored device 502 and configured to provide a unique ID associated with the monitored device 502 to a user of the monitored device 502, transmit the unique ID to the remote computing device 510 for authentication, record location and usage data of the monitored device 502, and transmit the data to the remote computing device 502 periodically. The monitored device 502 may also include an addressable memory 514 configured for, in addition to other functions, storing collected GPS and usage data.

Further included in the system 500 may be a second device 508 that may be a test equipment. The second device 508 may further be configured to transmit to and/or receive data from a monitored device 502 in one embodiment. The second device 508 may further be configured to communicate with a plurality of connected monitored devices 502 in other embodiments.

The system 500 may also include a remote computing device 510, where in one embodiment the remote computing device 510 may be configured to authenticate a monitoring device 502. The remote computing device 510 may be external to the monitored device 502 and include an addressable memory 512. The remote computing device may be configured to serve the monitoring application 504, associate the monitored device 502 with the unique ID in the addressable memory 512, and authenticate a monitored device 502 by determining if the ID transmitted from the monitored device 502 is found to be stored in the addressable memory 512, and register the monitored device 502 if the unique ID is successfully authenticated. The remote computing device 510 may further be configured to receive, store, and analyze received GPS and usage data sent from the monitored device 502. The addressable memory may be configured to store received and analyzed GPS and usage data of the monitored device 502.

In some embodiments, the monitored device, such as a mobile phone or mobile computer, may be connected to the second device that may include a test equipment, and may be used to test a cellular network or wireless network by the test equipment measuring network signal strength and capacity while the monitored device utilizes the network. Meanwhile, in order to test the network, the monitored device may be positioned in different locations under different networks. In this case, a monitoring application installed on the monitored device may collect data of location and usage of this monitored device and transmit the collected data to the remote computing device, thereby allowing the user to see the location and usage of this monitored device.

The monitoring application may be designed to use built-in capabilities of the monitored device to transmit device data, such as location, usage, and performance of the monitored device, back to the remote computing device. The monitoring application may also be designed to transmit a heartbeat on a regular basis, for example, every hour, to indicate operation and/or utilization of the monitored device, to the remote computing device. In the remote computing device, the transmitted location and utilization data may be presented on a map and utilization dashboard, and other data may be presented on a report to notify the location data and usage data or a status when the monitored device has been switched off or is not being used.

In some embodiments, the system 500 may include a test equipment device, as the second device 508, that may be connected to the monitored device 502 and configured to operate the monitored device 502 to utilize a wireless network in a location where the monitored device 502 is located. In this embodiment, the monitored device 502 may record the location and usage data while the monitored device 502 is operated utilizing the wireless network. According to these embodiments, the test device 508 may test wireless networks in different locations by using the monitored device 502 while the remote computing device 510 may be configured to monitor and track conditions of the monitored device 502. In the above embodiments, the usage data may further include information of the second device and wireless data usage.

Figure 6:
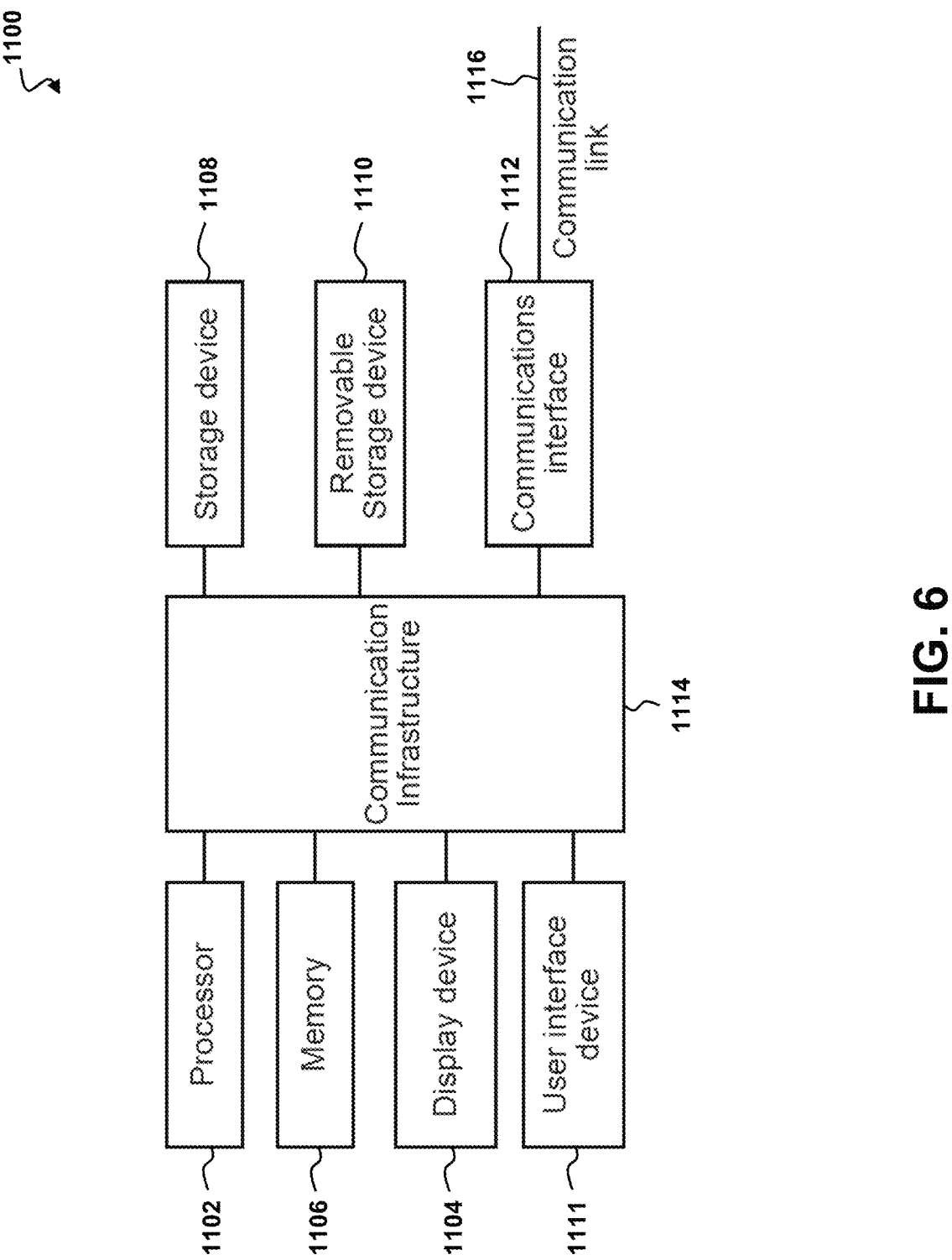
FIG. 6 shows a high-level block diagram of a computing system for implementing an embodiment of the system and method of tracking location and usage data of a monitored device.

FIG. 6 is a high-level block diagram showing a computing system 1100 including a computer system useful for implementing an embodiment of the system, method, and process, disclosed herein. Embodiments of the system may be implemented in different computing environments. The computer system includes one or more processors 1102, and can further include an electronic display device 1104 (e.g., for displaying graphics, text, and other data), a main memory 1106 (e.g., random access memory (RAM)), a storage device 1108, a removable storage device 1110 (e.g., removable storage drive, a removable memory module, a magnetic tape drive, an optical disk drive, a computer readable medium having stored therein computer software and/or data), a user interface device 1111 (e.g., keyboard, touch screen, keypad, pointing device), and a communication interface 1112 (e.g., modem, a network interface (such as an Ethernet card), a communications port, or a PCMCIA slot and card). The communication interface 1112 allows software and data to be transferred between the computer system and external devices. The computer system further includes a communications infrastructure 1114 (e.g., a communications bus, cross-over bar, or network) to which the aforementioned devices/modules are connected as shown in FIG. 6.

Information transferred via the communications infrastructure 1114 may be in the form of signals such as electronic, electromagnetic, optical, or other signals capable of being received by the communications interface 1112, via a communication link 1116 that carries signals and may be implemented using wire or cable, fiber optics, a phone line, a cellular/mobile phone link, a radio frequency (RF) link, and/or other communication channels. Computer program instructions representing the block diagrams and/or flowcharts herein may be loaded onto the computer system, such as a computer, programmable data processing apparatus, or processing devices, to cause a series of operations performed thereon to produce a computer implemented process.

Embodiments have been described with reference to flowchart illustrations and/or block diagrams of methods, apparatus (systems), and computer program products. Each block of such illustrations/diagrams, or combinations thereof, can be implemented by computer program instructions. The computer program instructions, when provided to a processor, produce a machine, such that the instructions, which execute via the processor, create means for implementing the functions/operations specified in the flowchart and/or block diagram. Each block in the flowchart/block diagrams may represent a hardware and/or software module or logic, implementing embodiments. In alternative implementations, the functions noted in the blocks may occur out of the order noted in the figures, concurrently, etc.

Computer programs (i.e., computer control logic) are stored in main memory and/or secondary memory. The computer programs may also be received via the communications interface 1112. Such computer programs, when executed, enable the computer system to perform the features of the embodiments as discussed herein. In particular, the computer programs, when executed, enable the processor and/or multi-core processor to perform the features of the computer system. Such computer programs represent controllers of the computer system.

Figure 7:
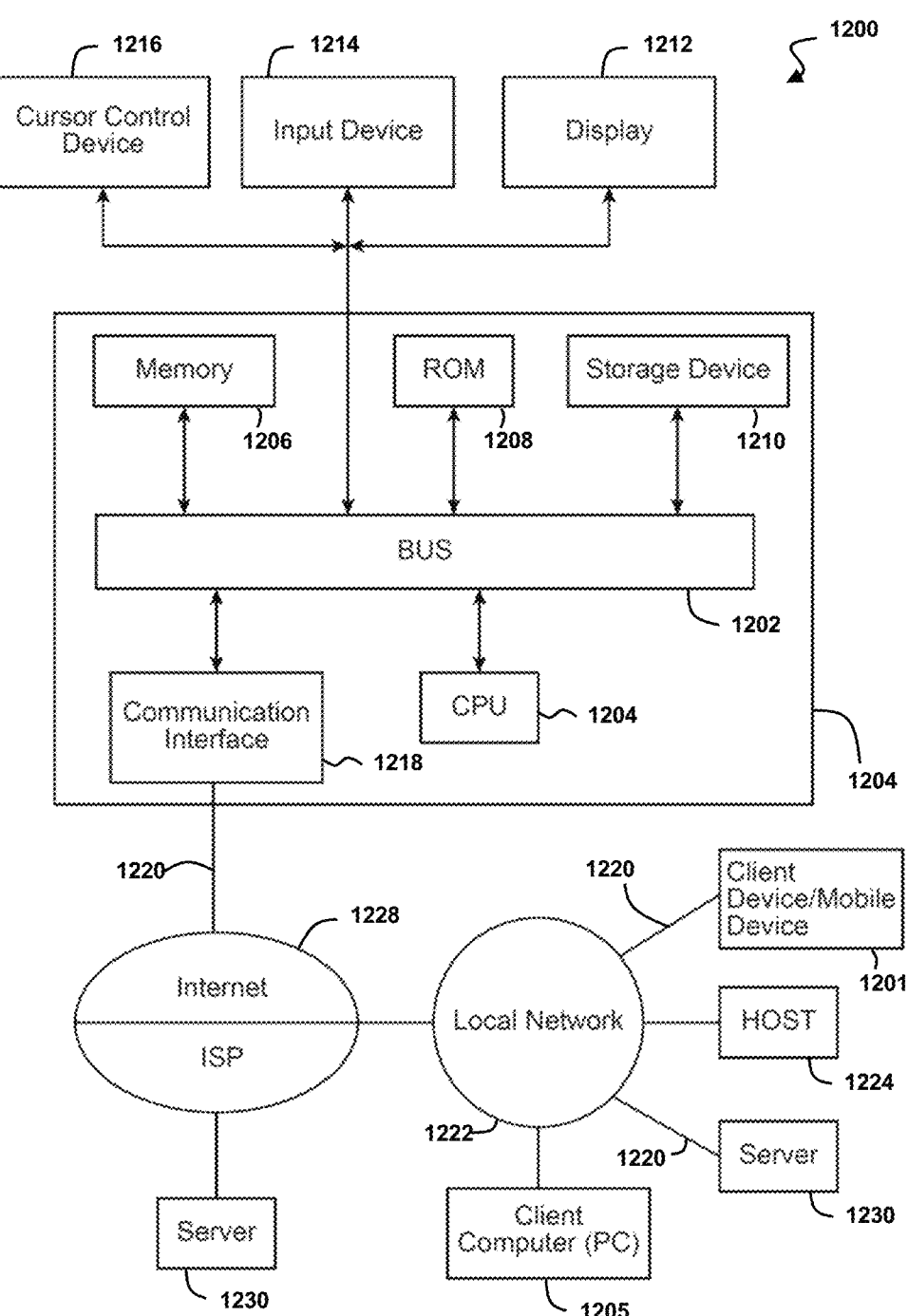
FIG. 7 shows a block diagram of a system in which an embodiment of the system and method of tracking location and usage data of a monitored device may be implemented.

FIG. 7 shows a block diagram of an example system 1200 in which an embodiment may be implemented. The system 1200 includes one or more client devices 1201 such as consumer electronics devices, connected to one or more server computing systems 1230. A server 1230 includes a bus 1202 or other communication mechanism for communicating information, and a processor (CPU) 1204 coupled with the bus 1202 for processing information. The server 1230 also includes a main memory 1206, such as a random access memory (RAM) or other dynamic storage device, coupled to the bus 1202 for storing information and instructions to be executed by the processor 1204. The main memory 1206 also may be used for storing temporary variables or other intermediate information during execution or instructions to be executed by the processor 1204. The server computer system 1230 further includes a read only memory (ROM) 1208 or other static storage device coupled to the bus 1202 for storing static information and instructions for the processor 1204. A storage device 1210, such as a magnetic disk or optical disk, is provided and coupled to the bus 1202 for storing information and instructions. The bus 1202 may contain, for example, thirty-two address lines for addressing video memory or main memory 1206. The bus 1202 can also include, for example, a 32-bit data bus for transferring data between and among the components, such as the CPU 1204, the main memory 1206, video memory and the storage 1210. Alternatively, multiplex data/address lines may be used instead of separate data and address lines.

The server 1230 may be coupled via the bus 1202 to a display 1212 for displaying information to a computer user. An input device 1214, including alphanumeric and other keys, is coupled to the bus 1202 for communicating information and command selections to the processor 1204. Another type or user input device comprises cursor control 1216, such as a mouse, a trackball, or cursor direction keys for communicating direction information and command selections to the processor 1204 and for controlling cursor movement on the display 1212.

According to one embodiment, the functions are performed by the processor 1204 executing one or more sequences of one or more instructions contained in the main memory 1206. Such instructions may be read into the main memory 1206 from another computer-readable medium, such as the storage device 1210. Execution of the sequences of instructions contained in the main memory 1206 causes the processor 1204 to perform the process steps described herein. One or more processors in a multi-processing arrangement may also be employed to execute the sequences of instructions contained in the main memory 1206. In alternative embodiments, hard-wired circuitry may be used in place of or in combination with software instructions to implement the embodiments. Thus, embodiments are not limited to any specific combination of hardware circuitry and software.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network that allow a computer to read such computer readable information. Computer programs (also called computer control logic) are stored in main memory and/or secondary memory. Computer programs may also be received via a communications interface. Such computer programs, when executed, enable the computer system to perform the features of the embodiments as discussed herein. In particular, the computer programs, when executed, enable the processor, which may be a multi-core processor, to perform the features of the computer system. Accordingly, such computer programs represent controllers of the computer system.

Generally, the term "computer-readable medium" as used herein refers to any medium that participates in providing instructions to the processor 1204 for execution. Such a medium may take many forms, including but not limited to, non-volatile media, volatile media, and transmission media. Non-volatile media includes, for example, optical, or magnetic disks, such as the storage device 1210. Volatile media includes dynamic memory, such as the main memory 1206. Transmission media includes coaxial cables, copper wire and fiber optics, including the wires that comprise the bus 1202. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to the processor 1204 for execution. For example, the instructions may initially be carried on a magnetic disk of a remote computer. The remote computer can load the instructions into its dynamic memory and send the instructions over a telephone line using a modem. A modem local to the server 1230 can receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1206, from which the processor 1204 retrieves and executes the instructions. The instructions received from the main memory 1206 may optionally be stored on the storage device 1210 either before or after execution by the processor 1204.

The server 1230 also includes a communication interface 1218 coupled to the bus 1202. The communication interface 1218 provides a two-way data communication coupling to a network link 1220 that is connected to the world wide packet data communication network now commonly referred to as the Internet 1228. The Internet 1228 uses electrical, electromagnetic, or optical signals that carry digital data streams. The signals through the various networks and the signals on the network link 1220 and through the communication interface 1218, which carry the digital data to and from the server 1230, are exemplary forms or carrier waves transporting the information.

In another embodiment of the server 1230, the communication interface 1218 is connected to a network 1222 via a communication link 1220. For example, the communication interface 1218 may be an integrated services digital network (ISDN) card or a modem to provide a data communication connection to a corresponding type of telephone line, which can comprise part of the network link 1220. As another example, the communication interface 1218 may be a local area network (LAN) card to provide a data communication connection to a compatible LAN. Wireless links may also be implemented. In any such implementation, the communication interface 1218 sends and receives electrical electromagnetic or optical signals that carry digital data streams representing various types of information.

The network link 1220 typically provides data communication through one or more networks to other data devices. For example, the network link 1220 may provide a connection through the local network 1222 to a host computer 1224 or to data equipment operated by an Internet Service Provider (ISP). The ISP in turn provides data communication services through the Internet 1228. The local network 1222 and the Internet 1228 both use electrical, electromagnetic, or optical signals that carry digital data streams. The signals through the various networks and the signals on the network link 1220 and through the communication interface 1218, which carry the digital data to and from the server 1230, are exemplary forms or carrier waves transporting the information.

The server 1230 can send/receive messages and data, including e-mail, program code, through the network, the network link 1220 and the communication interface 1218. Further, the communication interface 1218 can comprise a USB/Tuner and the network link 1220 may be an antenna or cable for connecting the server 1230 to a cable provider, satellite provider or other terrestrial transmission system for receiving messages, data, and program code from another source.

The example versions of the embodiments described herein may be implemented as logical operations in a distributed processing system such as the system 1200 including the servers 1230. The logical operations of the embodiments may be implemented as a sequence of steps executing in the server 1230, and as interconnected machine modules within the system 1200. The implementation is a matter of choice and can depend on performance of the system 1200 implementing the embodiments. As such, the logical operations constituting said example versions of the embodiments are referred to for example, as operations, steps or modules.

Similar to the server 1230 described above, the client device 1201 can include a processor, memory, storage device, display, input device and communication interface (e.g., e-mail interface) for connecting the client device to the Internet 1228, the ISP, or LAN 1222, for communication with the servers 1230.

The system 1200 can further include computers (e.g., personal computers, computing nodes) 1205 operating in the same manner as client devices 1201, wherein a user can utilize one or more computers 1205 to manage data in the server 1230.

Figure 8:
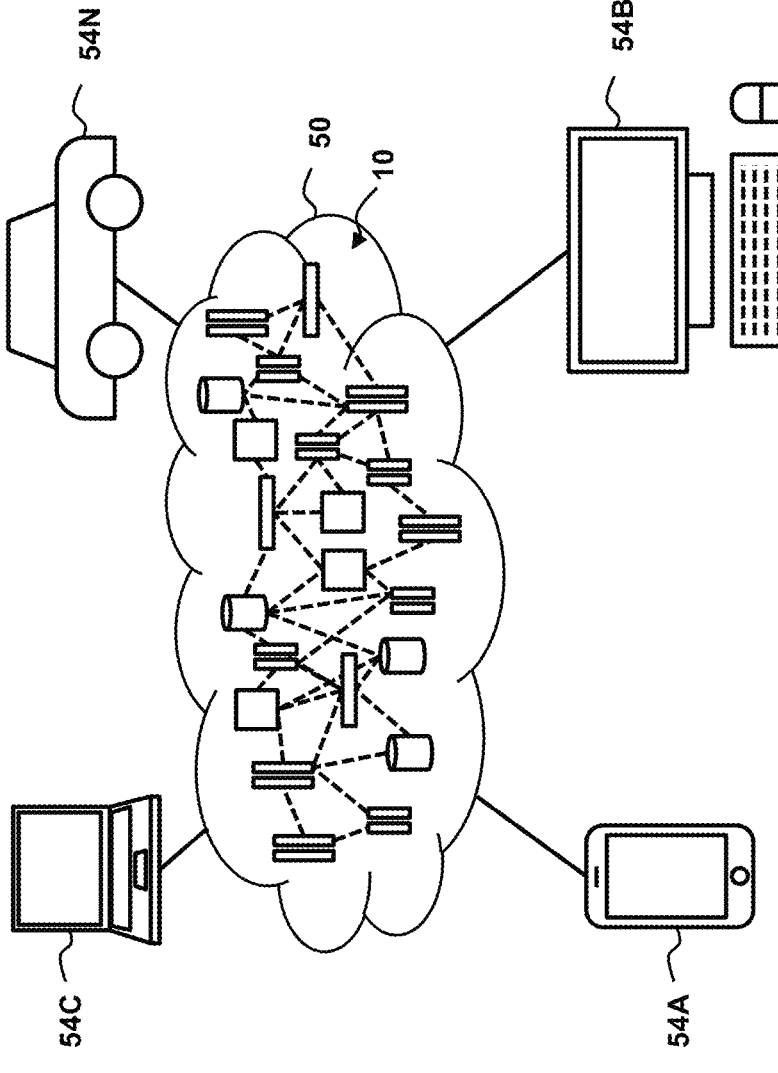
FIG. 8 depicts a cloud computing environment for implementing an embodiment of the system and method of tracking location and usage data of a monitored device.

Referring now to FIG. 8, illustrative cloud computing environment 50 is depicted. As shown, the cloud computing environment 50 comprises one or more cloud computing nodes 10 with which local computing devices used by cloud consumers, such as, for example, personal digital assistant (PDA), smartphone, smart watch, set-top box, video game system, tablet, mobile computing device, or cellular telephone 54A, desktop computer 54B, laptop computer 54C, and/or automobile computer system 54N may communicate. The nodes 10 may communicate with one another. They may be grouped (not shown) physically or virtually, in one or more networks, such as Private, Community, Public, or Hybrid clouds as described hereinabove, or a combination thereof. This allows the cloud computing environment 50 to offer infrastructures, platforms, and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further, it is intended that the scope of the present invention is herein disclosed by way of examples and should not be limited by the particular disclosed embodiments described above.

What is claimed is:

1. A method comprising:

providing, by a monitored device, a unique ID associated with the monitored device at bootup;

associating, by a remote computing device, the monitored device with the unique ID based on receiving the unique ID from the monitored device;

authenticating, at the remote computing device, the monitored device via an OAUTH2 server and using the unique ID;

registering the monitored device with the remote computing device based on a successful authentication using the unique ID;

recording location data associated with the registered monitored device locally at the monitored device;

transmitting, by the monitored device, the location data to the remote computing device periodically;

recording device usage data associated with the monitored device locally at the monitored device;

transmitting, by the monitored device, the device usage data to the remote computing device periodically; and managing the location data and the device usage data at the remote computing device, wherein the managing comprises determining whether to store the received location data and the received device usage data, and whether to delete previously received location data and previously received device usage data associated with the monitored device, thereby tracking location and device usage data of the monitored device.

2. The method of claim 1, wherein the step of associating the monitored device with a unique ID further comprises storing the unique ID with information related to the monitored device, including at least one of: an asset tag, an asset number, a MAC address, and a combination of the asset tag, the MAC address, a manufacture number, a manufacture name, and a model number.

3. The method of claim 1, wherein the remote computing device is external to the monitored device.

4. The method of claim 1, wherein the authentication using the unique ID includes:

transmitting the unique ID from the monitored device to the remote computing device; and determining, by the remote computing device, if the unique ID transmitted from the monitored device is found to be stored in the remote computing device.

5. The method of claim 1, wherein the location data and the usage data are used to determine a status indicating when the monitored device has been switched off or is not being used.

6. The method of claim 1, wherein each of the steps of transmitting the location data and transmitting the usage data is performed according to a transmission schedule at set times including at least one of: at bootup of the monitored device, a predetermined transmission time interval, and a predetermined transmission time point.

7. The method of claim 6, further comprising the step of transmitting a heartbeat of the monitored device at a time outside of the transmission schedule, wherein the heartbeat includes only usage data on a daily basis.

8. The method of claim 1, wherein each of the steps of transmitting the location data and transmitting the usage data is triggered by an event that includes a significant change in the location data and a detection of the location data exiting outside a predetermined boundary.

9. The method of claim 8, wherein in the steps of transmitting the location data and transmitting the usage data, an actual time of transmitting the location data and an actual time of transmitting the usage data are different if one of the location data and the usage data has not been recorded at the set time.

10. The method of claim 8, wherein each of the steps of transmitting the location data and transmitting the usage data includes retrying transmission of data, wherein the retrying transmission includes retransmitting the data if it has been detected that a previously transmitted data was not received in the remote computing device.

11. The method of claim 10, wherein the retrying transmission is limited to a predetermined number.

12. The method of claim 10, wherein in each of the steps of transmitting the location data and transmitting the usage data, the transmission and retransmission of the location and usage data are performed by a request from the remote computing device.

13. The method of claim 1, wherein the step of transmitting the usage data includes a time and date stamp, a battery level, a wireless data usage, an internal temperature of the monitored device, a signal strength, proximity of other devices, and measurements, and an uptime duration defined as a time period when the device was booted to a current time.

14. The method of claim 1, wherein the step of managing includes executing, by at least one of the remote computing device and the monitored device, logic to determine whether to store every location data with every usage data based on at least one of comparison with previous data received to see if a change has occurred, a filter set by the user to only store certain data, and a threshold number of data points.

15. The method of claim 1, wherein the step of managing includes processing the location data and the usage data received by the remote computing device by applying machine learning to the received location and the usage data to leverage data to improve performance of the monitored device.

16. The method of claim 1, wherein the step of authenticating is performed using an OAUTH2 method comprising:

sending, by the monitored device, a communication request to the OAUTH2 server of the remote computing device;

authenticating and granting the communication request, by the OAUTH2 server and returning a token to the monitored device, wherein the steps of transmitting the location and usage data includes the steps of:

sending, by the monitored device, a second request with the token and the location and usage data to a web service portion of the remote computing device; and sending, by the web service portion, the location and usage data to a database service of the remote computing device, wherein the step of managing includes storing and processing the location and usage data.

17. The method of claim 1, further comprising operating, by a test device connected to the monitored device, the monitored device to utilize a wireless network in a location where the monitored device is located, wherein the steps of recording the location and usage data are performed while the monitored device is operated utilizing the wireless network, so that the test device tests wireless networks in different locations by using the monitored device while monitoring and tracking the monitored device in the remote computing device.

18. A system comprising:

a monitored device that includes a processor and addressable memory, and is in communication with a remote computing device, wherein the monitored device is configured to:

determine an ID associated with the monitored device at bootup of the monitored device;

transmit the determined ID to the remote computing device for authentication;

store collected location and usage data associated with the monitored device; and the remote computing device includes a processor and addressable memory, the remote computing device is external to the monitored device, and the remote computing device is configured to:

receive the determined ID and associate the monitored device with the determined ID in the addressable memory;

authenticate the monitored device via determining if the determined ID transmitted from the monitored device is found to be stored in the addressable memory;

register the monitored device if the determined ID is successfully authenticated;

transmit a token to the monitored device indicating that a server authentication was granted;

wherein the monitored device is further configured to transmit the stored location and usage data to the remote computing device periodically, wherein the transmission of the stored collected location and usage data is at least one of: at the same time and at different intervals; and wherein the remote computing device is further configured to receive the location and usage data from the monitored device, and store and manage the received data based on a successful authentication, thereby tracking location and usage data of the monitored device at the remote computing device.

* * * * *